US007313687B2

(12) United States Patent
Kaler et al.

(10) Patent No.: US 7,313,687 B2
(45) Date of Patent: Dec. 25, 2007

(54) ESTABLISHING A SECURE CONTEXT AT AN ELECTRONIC COMMUNICATIONS END-POINT

(75) Inventors: Christopher G. Kaler, Sammamish, WA (US); Giovanni M. Della-Libera, Seattle, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 847 days.

(21) Appl. No.: 10/340,694

(22) Filed: Jan. 10, 2003

(65) Prior Publication Data

US 2004/0139322 A1 Jul. 15, 2004

(51) Int. Cl.
*H04L 9/00* (2006.01)
(52) U.S. Cl. .................................. 713/152; 713/169
(58) Field of Classification Search .................. None
See application file for complete search history.

(56) References Cited

U.S. PATENT DOCUMENTS

| | | | |
|---|---|---|---|
| 6,694,431 B1* | 2/2004 | Binding et al. | 713/160 |
| 6,952,768 B2* | 10/2005 | Wray | 713/152 |
| 7,096,352 B2* | 8/2006 | Kang et al. | 713/152 |
| 2003/0041178 A1* | 2/2003 | Brouk et al. | 709/313 |
| 2004/0210766 A1* | 10/2004 | Kroselberg | 713/201 |

OTHER PUBLICATIONS

Cryptography and Network Security Principles and Practice□□William Stalings□□1999□□Prentice Hall□□Second Edition□□pp. 311-314 and 413-421.*
Winslett, M. et al., Formal Query Languages for Secure Relational Databases, ACM Transactions on Database Systems, Association for Computing Machinery, New York, NY, vol. 19, No. 4, Dec. 1994, pp. 626-662.
Golomb, K. et al., How do I Ensure Secure Communications From a Java Applet? Dr. Dobb's Journal, Miller Freeman, vol. 23, No. 6, Jun. 1998, pp. 107-109 & 124-125.

* cited by examiner

*Primary Examiner*—Emmanuel L. Moise
*Assistant Examiner*—David J. Pearson
(74) *Attorney, Agent, or Firm*—Workman Nydegger

(57) ABSTRACT

A first application layer at a first message processor identifies a first portion of context information. A second message processor receives the first portion of context information. A second application layer at the second message processor identifiers a second portion of context information. The second message processor sends the second portion of context information along with a first digital signature created from both the first and second portions of context information. The first message processor receives the second portion of context information and first digital signature. The first message processor sends a second digital signature created from the first and second portions of context information to the second message processor. If both the first and second digital signatures are authenticated, a secure context can be established between the first and second application layers.

20 Claims, 6 Drawing Sheets

ESTABLISHING A SECURE CONTEXT AT AN ELECTRONIC COMMUNICATIONS END-POINT

BACKGROUND OF THE INVENTION

1. The Field of the Invention

The present invention relates to computer network security, and more specifically, to mechanisms for establishing a secure context at an electronic communications end-point.

2. Background and Relevant Art

Computer networks have enhanced our ability to communicate and access information by allowing one computer or device (hereinafter both referred to as a "computing system") to communicate over a network with another computing system using electronic messages. When transferring an electronic message between computing systems, the electronic message will often pass through a protocol stack that performs operations on the data within the electronic message (e.g., packetizing, routing, flow control). The Open System Interconnect ("OSI") model is an example of a networking framework for implementing a protocol stack.

The OSI model breaks down the operations for transferring an electronic message into seven distinct "layers," each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to higher intermediate layers and then eventually received at the application layer. The application layer, the upper most layer, is responsible for supporting applications and end-user processes. Another layer incorporated by most protocol stacks is the transport layer. An example of a transport layer protocol is the Transmission Control Protocol ("TCP").

Often, when two computing systems desire to communicate with each other, for example, by transferring a number of electronic messages, the two computing systems will establish a secure context. That is, the two computing systems can authenticate and agree on the mechanisms used to secure the data (e.g., data within electronic messages) transferred between the computing systems. This can often include activating security mechanisms within protocol stacks operating at each of the two computing systems.

To initiate the establishment of a secure context, two computing systems typically exchange a number of configuration parameters (often referred to as performing a "handshake"). One example of a handshake is the Secure Socket Layers ("SSL") handshake sequence frequently used to establish a secure context between a client computing system (hereinafter referred to as a "client") and a server computing system (hereinafter referred to as a "server") on the Internet. SSL is typically configured to operate between a transport layer (e.g., a layer implementing TCP) and higher layers in a protocol stack (e.g., an application layer). During an SSL handshake sequence, a client and server can exchange SSL version numbers, cipher settings, and other communication information necessary to communicate using SSL. Once established, an SSL secure context allows the client and server to cooperate in the creation of session keys for encryption, decryption, and tamper detection (signing) of electronic messages transferred between the client and server.

Unfortunately, the information that is exchanged between the client and the server during many, if not all, conventional handshake sequences is prescribed by the handshake protocols used to implement the handshake sequences. For example, an SSL handshake sequence is often limited to exchanging information about supported versions of SSL. Handshake protocols can, in some instances, make decisions based on the prescribed information that is exchanged between a client and server. Thus to a limited extent, prescribed rules can vary a subsequent portion of prescribed information based on a determination with respect to an initial portion of prescribed information. For example, a handshake protocol may detect that a certain version of SSL is mutually supported (an initial portion) and as a result vary the prescribed information that is exchanged (a subsequent portion) during the SSL handshake. However, these limited decisions are for the most part made based on prescriptive rules that are inherent to a handshake protocol. Thus, although a handshake protocol may vary exchanged information somewhat, the exchanged information is still limited to that resulting from the prescriptive rules inherent in the handshake protocol.

Altering the prescriptive rules and/or prescribed information for a handshake protocol can lead to incompatibilities since handshake protocols, such as, for example, the SSL handshake protocol, are often well established and may even be standards. Thus, altering handshake protocol functionality at one computing system may cause incompatibilities with large numbers of other computing systems. Further, even if a handshake protocol were compatibly altered, there is little chance that every possible combination of properties for a security context could be implemented.

Most application layer processes (in part due to the configuration of protocol stacks) lack the ability to alter functionality at lower layers of a protocol stack where handshake protocols typically function. Thus, if an application layer process desired a combination of security context properties that were not supported by a handshake protocol, the application layer process would have limited, if any, mechanisms to create a security context with the desired security context properties. For example, it may be that an application designer desires for a particular distributed application to utilize SSL version 2 even if both a client and server support SSL version 3. However, the application designer may be precluded from implementing this desired functionality due to a prescriptive rule of the SSL handshake protocol (e.g., a rule that forces utilization of SSL version 3 when computing systems support SSL version 3). This is unfortunate as the application designer is often in a better position to decide the desired security context properties for an application.

Further, many conventional handshake protocols used to establish a secure context are point-to-point protocols that permit establishment of a security context between two connected points. However, these same handshake protocols do not permit security contexts to be established between computing systems that are separated by intermediaries, such as, for example, by a number of intermediary computing systems in a routing path. Thus, to securely process electronic messages transferred between a client and a server, separate security contexts (which can each have different properties) may be established between a client, any intermediaries, and a server.

FIG. 6 is a prior art Figure illustrating client 601, intermediary 605, and server 602. In FIG. 6, security context 612 can be established between client 601 and intermediary 605 based on information that is exchanged between client 601 and intermediary 605. Likewise, security context 613 can be established between intermediary 605 and server 602 based on information that is exchanged between intermediary 605 and server 602. However, as the information exchanged between client 601 and intermediary 605 can differ from the information exchanged between intermediary 605 and server 602, the properties of security context 612 and security context 613 can also differ. For example, security context 612 may support Windows NT LAN Manager ("NTLM") authentication but not Kerberos authentication (which is often considered more secure than NTLM authentication), while security context 613 supports both Kerberos authentication and NTLM authentication.

This can be problematic when an electronic message is sent from client 601 to server 602. Server 602 may have to rely on security evaluations made by intermediary 605 and trust intermediary 605's handling of the content of the electronic message. However, the properties of the security contexts 612 and 613 might differ from a security context that could be established directly between client 601 and server 602. Thus, subjecting the content of an electronic message to the security mechanisms of intermediary 605 may be less secure than if the content of the electronic message were transferred directly between client 601 and server 602.

Therefore systems, methods, computer program products, and data structures for establishing a secure context at a communications end-point would be advantageous.

BRIEF SUMMARY OF THE INVENTION

The foregoing problems with the prior state of the art are overcome by the principles of the present invention, which are directed towards methods, systems, computer program products, and data structures for establishing a secure context at a communications end-point.

A first application layer at a first end message processor identifies that a first portion of context information is to be used to establish a secure context with a second application layer at a second end message processor. This can include a first portion of a distributed application at the first message processor identifying context information for establishment of a secure context with a second portion of the distributed application at the second end message processor. The context information is identified such that a secure context can be established between the first and second application layers independent of other context data identified at other layers in a communication stack (e.g., independent of context data exchanged during a Secure Socket Layers handshake). Thus, an application designer can more easily design a distributed application such that portions of the distributed application can establish a secure context having particular desired properties.

The first end message processor sends the first portion of context information (which may be routed along a first routing path including one or more intermediary message processors) to the second end message processor. The second end message processor receives the first portion of context information. The second application layer identifies that a second portion of context information is to be used along with the first portion of context information to establish the secure context between the first application layer and the second application layer. The second end message processor sends (e.g., via a second routing path that may or may not be the same as the first routing path) the second portion of context information along with a first digital signature, which the second end message processor created from at least the first and second portions of context information, to the first end message processor.

The first end message processor receives the second portion of context information and the first digital signature. If the first digital signature was signed with a private key of the second message processor, the first end message processor may authenticate the second end message processor. The first end message processor creates a second digital signature from both the first and second portions of context information and sends the second digital signature to the second end message processor. The second end message processor receives the second digital signature. In some embodiments, if the second digital signature was signed with a private key of the first end message processor, the second end message processor may authenticate the first end message processor.

If one of the end message processors authenticates exchanged context information (or is allowed to be anonymous), a one-way secure context can be established. For example, the context from the first end message processor to the second end message processor may be a secure context but not vice-versa. That is, the first end message processor may have authenticated context information that is received at the second end message processor. On the other hand, the second end message processor may not have authenticated context information received at the first end message processor. If each end message processor authenticates exchanged context information a two-way secure context can be established. In some embodiments, three or more message processors may authenticate exchanged context information to create a secure context among the three or more message processors.

The principles of the present invention provide for the arbitrary selection of context information for establishing a secure context. Further, selected context information is extensible such that virtually any kind of context information may be exchanged in order to establish a secure context. Thus, application designers are not constrained to establishing a secure context based on the exchange of prescribed context information. Additionally, since context information is exchanged at the application layer (and is thus abstracted from lower layers below the application layer in a communication stack) end-to-end secure contexts can be more easily established.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
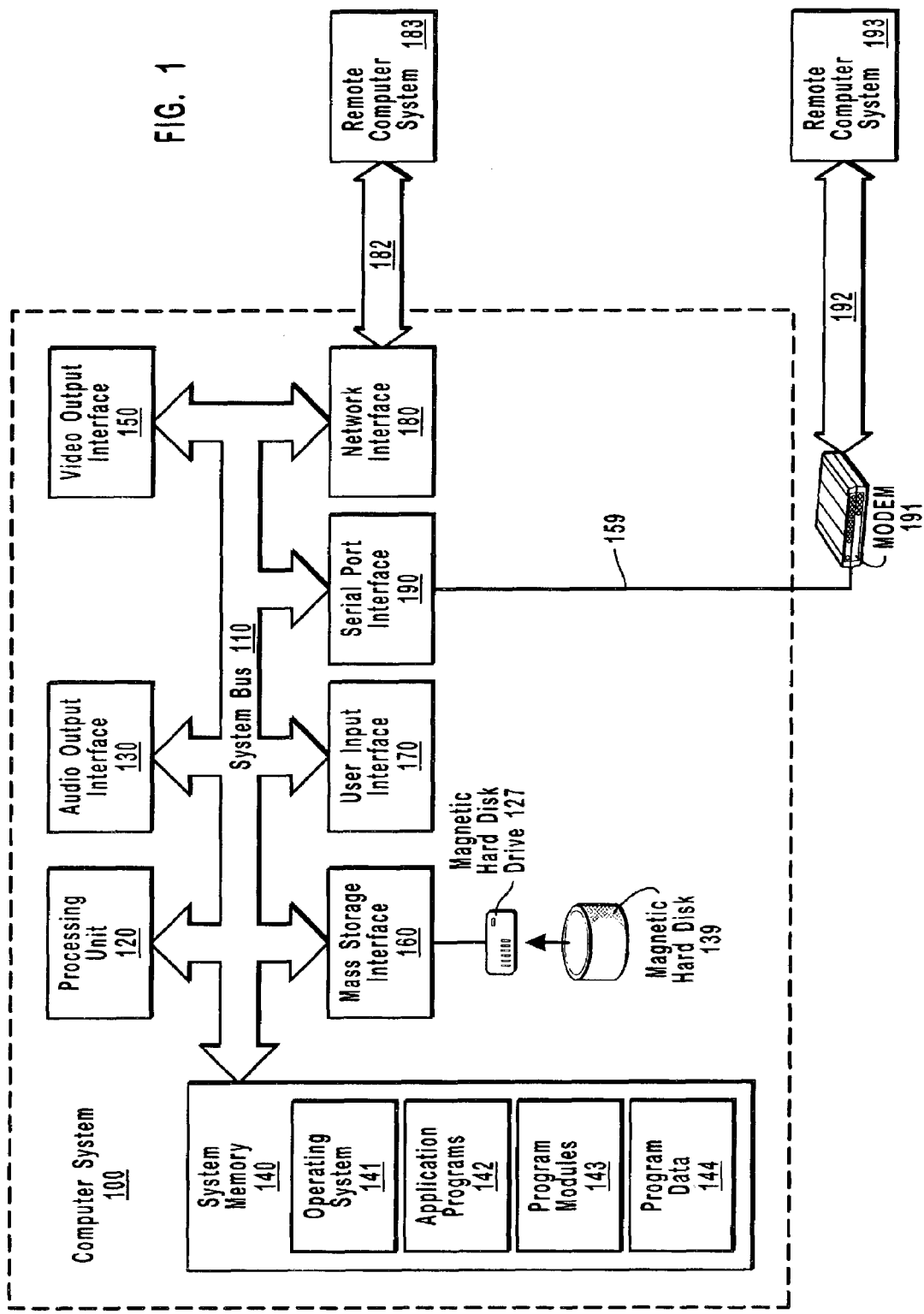
FIG. 1 illustrates a suitable operating environment for the principles of the present invention.

DETAILED DESCRIPTION OF THE
PREFERRED EMBODIMENTS

The principles of the present invention provide for establishing a secure context at a communications end-point. A first application layer at a first end message processor identifies that a first portion of context information is to be used to establish a secure context with a second application layer at a second end message processor. The first end message processor sends the first portion of the context information (e.g., along a first routing path through one or more intermediary message processors) to the second end message processor. The second end message processor receives the first portion of context information. The second message processor may establish a secure context from the first message processor based on the received first portion of context information. Alternately, the second message processor may determine that additional context information is to be exchanged.

In some embodiments, the second application layer identifies that a second portion of context information is to be used to establish a secure context with the first application layer. The second end message processor sends the second portion of context information to (e.g., along a second routing path that may or may not be the same as the first routing path) to the first end message processor. The first message processor receives the second portion of context information. The first message processor may establish a secure context from the second processor based on the received. Alternately, the first message processor may determine that additional context information is to be exchanged.

In some embodiments, context information is exchanged between application layers at three or more communication end-points (e.g., message processors) so as to establish a secure context among the three or more communication end-points. Context information is identified at the application layers such that a secure context can be established between the three or more communication end-points independent of other context data identified at other layers in corresponding communication stacks.

The second end message processor sends the second portion of context information along with a first digital signature (e.g., via the routing path), which the second end message processor created from both the first and second portions of context information, to the first end message processor. The first end message processor receives the second portion of context information and the first digital signature. If the first digital signature was signed with a private key for the second end message processor, the first end message processor can authenticate the second end message processor.

The first end message processor sends a second digital signature, which the first end message processor created from both the first and second portions of context information, to the second end message processor. The second end message processor receives the second digital signature. If the second digital signature was signed with a private key for the first message processor, the second end message processor can authenticate the first end message processor. If both the first and second end message processors are authenticated, a mutually secure context can be established.

By implementing the principles of the present invention, a secure context can be established at a communications end-point in a manner desired by an application designer that is potentially in a better position to decide a security context that is appropriate for a distributed application. Further, since context information is exchanged at the application layer, the context information is abstracted from lower layers of a communication stack below the application layer. As a result, a secure context can more easily be established at an end-point even though electronic messages are potentially transferred to the end-point along a routing path including one or more intermediary message processors.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems can exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that may enable the transport of electronic data, such as, for example, electronic messages, between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In this description and in the following claims, a "message processor" is defined as one or more modules (hardware and/or software) that operate together to perform messaging operations on electronic messages. Messaging operations may include, for example, initiating a message, accessing a message, appending information to a message, sending a message, receiving a message, routing a message, removing information from a message, and terminating a message. Any message processor can include the functionality to perform one or more of these messaging operations. It may be that the modules of a message processor are included within a general-purpose computer system, such as, for example, within a laptop or desktop computer system. On the other hand, it may also be that the modules of a message processor exist as a standalone special-purpose computer system.

In this description and in the following claims, "routing" is defined to include sending, receiving, and/or determining where to send an electronic message. For example, a sending message processor may initiate an electronic message and include routing information within the electronic message (e.g., in a routing field of the electronic message) that indicates the electronic message is to be routed to a receiving message processor. An intermediary message processor that accesses the electronic message can determine, based on the included routing information, where to route the electronic message.

If appropriate, the intermediary message processor can route the electronic message directly to the receiving message processor. However, it may be that the intermediary message processor is not directly connected to the receiving message processor (or for some other reason can not directly communicate with the receiving message processor). Thus, it may be appropriate for the intermediary message processor to route the electronic message to a second intermediary message processor that is included in a routing path between the sending and receiving message processors. Based on information within an electronic message, the intermediary message processor can also modify routing information (e.g., by changing values in a routing field of an electronic message) included in an electronic message. It may be that a routing field is included along with other fields as part of a data structure associated with an electronic message.

In this description and in the following claims, a "schema" is defined as an expression of a shared vocabulary between a plurality of computer systems and/or a plurality of message processors that allows the plurality of computer systems and/or the plurality of message processors to process documents according the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system or message processor that can access an XML schema can process XML documents in accordance with the XML schema.

In this definition and the following claims, "schema-based" refers to being defined by and/or within a schema.

In this description and the following claims, a "digital signature" refers to a digital code used authenticate a portion of data and/or to identify an entity (e.g., computer system, message processor, or application) that signed a portion of data. It may be that a digital signature is a shared secret that is shared between a plurality of entities. An entity may generate a digital signature by hashing (i.e., generating a number from a variable length portion of data) a portion of data (e.g., context information) to create a message digest. Virtually any hashing algorithm, such as, for example, the MD2 hash algorithm, the MD4 hash algorithm, the MD5 hash algorithm, or any variety of Secure Hash Algorithm (SHA-1, SHA-256, SHA-384, or SHA-512), can be used to generate a message digest.

A message digest can be used as a digital signature to authenticate the contents of an electronic message. For example, an entity that receives the contents of an electronic message and a message digest of the contents of the electronic message may generate a new message digest from the received contents and compare the received message digest to the new message digest. When the new and received message digests match, there is decreased likelihood that the contents of the electronic message have been altered. On the other hand, when new and received message digests differ, there is increased likelihood that the contents of the electronic message have been altered.

An entity may encrypt a message digest with a key, such as, for example, a key from a pubic/private signature key pair or a symmetric key. A signature algorithm, such as, for example, Digital Signature Algorithm ("DSA"), can take a message digest and a key as input and provide an encrypted message digest as output. When a message digest is encrypted using a private key of a signature key pair, entities with access to the corresponding public key can use the public key to decrypt the message digest and thereby authenticate the identity of the entity associated with the private key. Once decrypted, the message digest can be used to authenticate the data used to generate the message digest.

A digital signature can be inserted into an electronic message to authenticate context information or to authenticate context information and identify an entity that signed the context information.

In this description and the following claims, "context information" is defined generally to include any data associated with establishing a secure context at a communications end-point. Context information is defined to include, for example, information about the configuration of a message processor (e.g., components, versions of modules, etc.), shared secrets, public keys, private keys, digital signatures of context information, context information a message processor desires to be digitally signed, and error information. Context information can also include information that is randomly generated for the purposes of being signed by a computer system, message processor, or application. Context information can be represented using virtually any types of values including, numeric values (e.g., 12, D4, 11001, etc.), characters of text (e.g., "c", "v", "6", etc.), strings of text (e.g., "Context=", "Version 2", etc.), or user-defined values. It may be that context information includes a plurality of values such that each value represents the value of a field in a data structure.

In this description and the following claims, a "context marker" is defined as a data structure that is configured to store context information. A context marker can be used to transfer context information between message processors by including the context marker within an electronic message.

In this description and the following claims, a "communications stack" is defined as a plurality of communication layers, including at least an application layer and one lower layer that is below the application layer, that interoperate to transfer data between message processors. Communication stack is defined to include protocol stacks based around the Open Systems Interconnection ("OSI") networking framework for implementing protocols, including protocol stacks that incorporate the functionality of a plurality of OSI layers in a single layer. Communications stack is further defined to include any protocol stacks implementing the Transmission Control Protocol ("TCP") and/or the Internet Protocol ("IP").

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules and other data for computer system 100. For example, magnetic hard disk 139 can store one or more program modules including operating system 141, application programs 142, other program modules 143, and program data 144.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources.

As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 can be a client, an application server, or an authentication server.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 can be a client, an application server, or an authentication server.

Alternatively, computer system 100 can exchange data with external sources through other interfaces, such as, for example, a parallel port, a game port, or a universal serial bus ("USB") port.

It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules, communication stacks, distributed applications, as well as associated data, including electronic messages, context information, context markers, digital signatures, message digests, encrypted message digests, and schemas, may be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored in the mass storage device.

In a networked environment, program modules and associated data, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
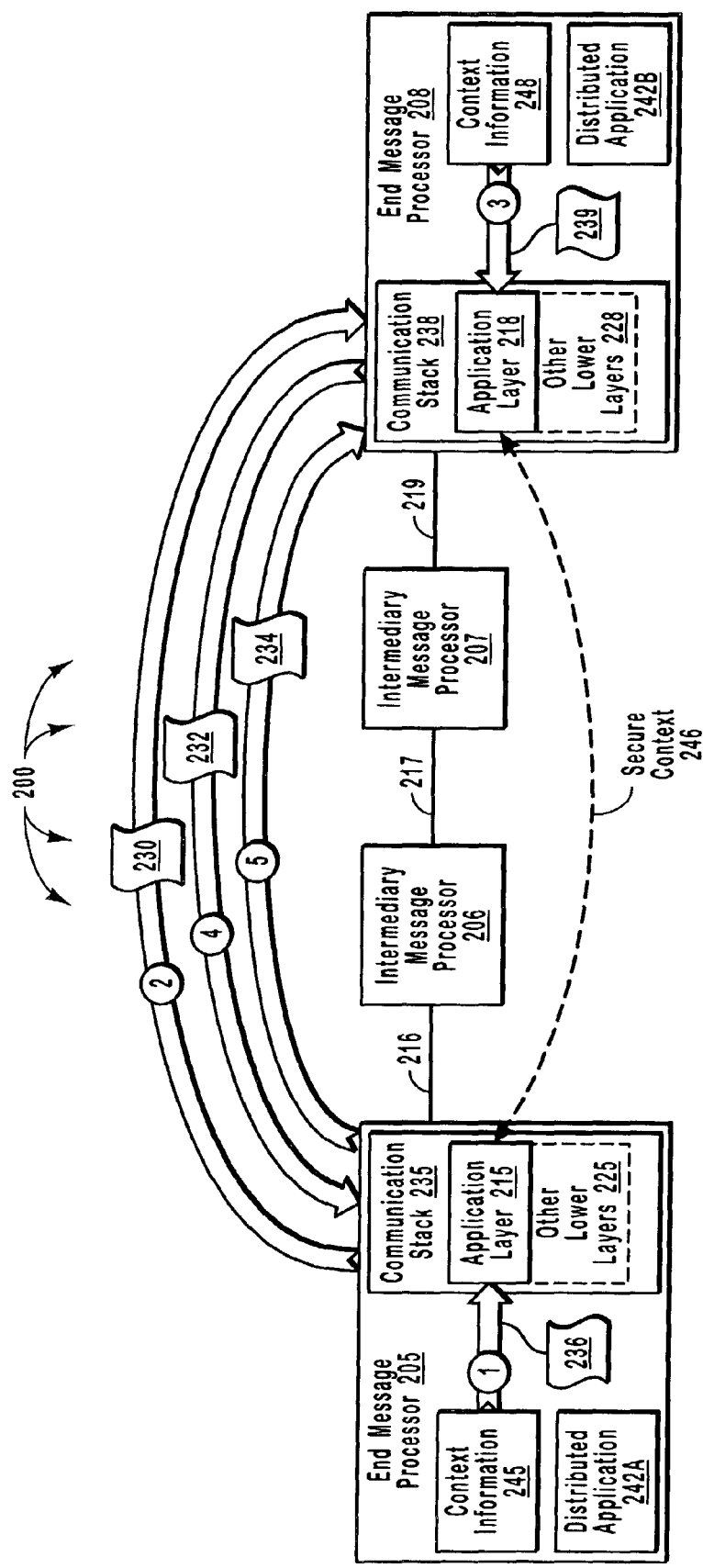
FIG. 2 illustrates an example of a network architecture that can facilitate establishing a secure context at a communications end-point.

FIG. 2 illustrates an example of network architecture 200 in which a secure context can be established at a communications end-point. As depicted in FIG. 2, three electronic messages (electronic messages 230, 232, and 234) may be transferred to establish a secure context at a communications end-point. However, it should be understood that the number of messages (as well as the context information contained in the messages) for establishing a secure context is arbitrary and can be configured based on the desired functionality. Thus, a secure context may be established at communications end-point in any embodiment where one or more electronic messages are transferred.

Depicted in network architecture 200 are end message processor 205, intermediary message processors 206 and 207, and end message processor 208. Corresponding logical communication links 216, 217, and 219 connect the message processors depicted in network architecture 200. End message processors 205 and 208 each include a corresponding communication stack (communication stacks 235 and 238) that can facilitate the transfer of electronic messages. Message processors depicted in network architecture 200 can initiate electronic messages and route electronic messages to (or through) other messages processors within network architecture 200 or other message processes external to network architecture 200 (not shown). For example, end message processor 205 can initiate electronic message 230 that is routed through intermediary message processors 206 and 207 and received at end message processor 208.

Figure 3:
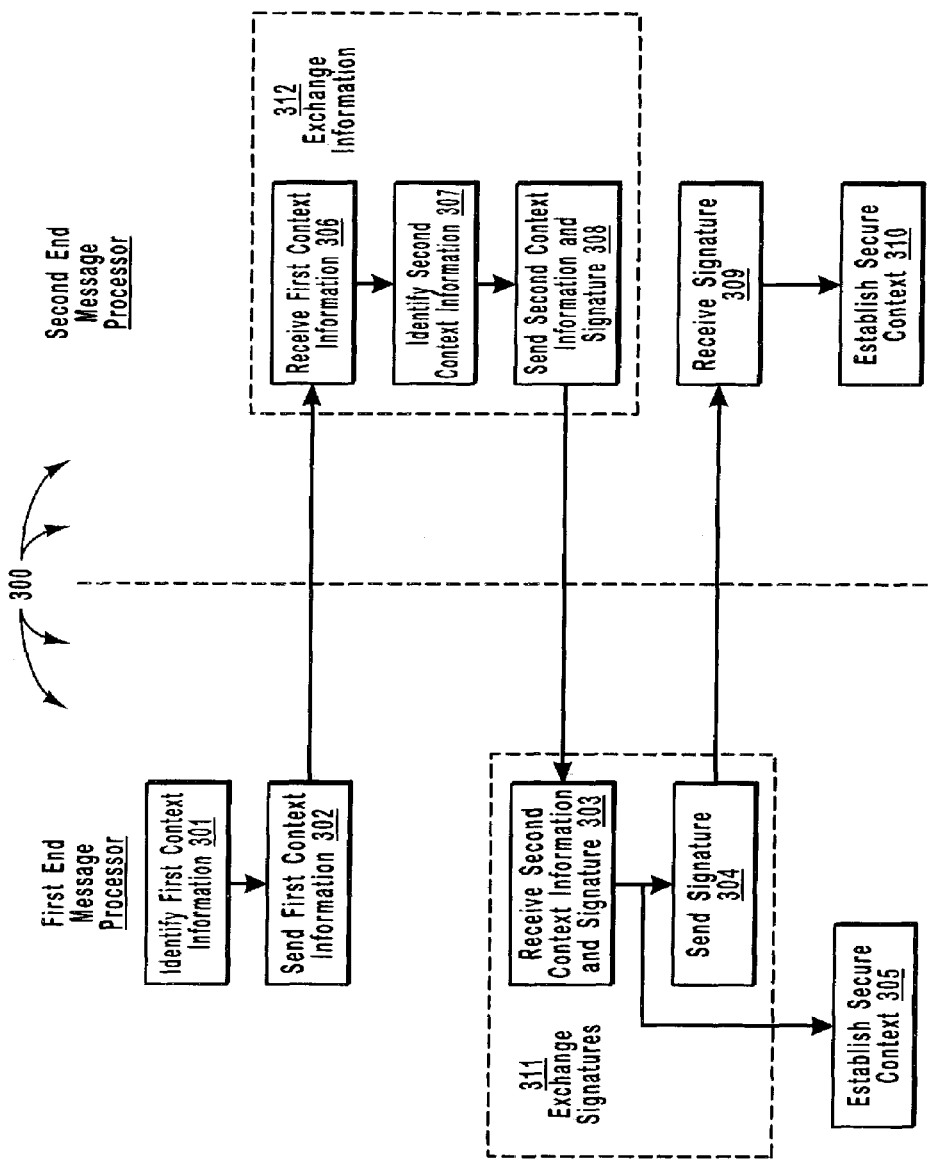
FIG. 3 illustrates a flowchart of a method for establishing a secure context between a first end message processor and a second end message processor.

FIG. 3 illustrates a flowchart of a method 300 for establishing a secure context between a first end message processor and a second end message processor. The method 300 will be described with respect to the message processors depicted in network architecture 200.

Method 300 includes an act of identifying first context information (act 301). Act 301 can include a first application layer at a first end message processor identifying that a first portion of context information is to be used to establish a secure context with a second application layer at a second end messages processor. For example, as illustrated by Arrow 1 in FIG. 2, application layer 215 identifies a portion of context information 236 (hereinafter referred to simply as "portion 236") from context information 245. Application layer 215 can indicate that portion 236 is to be used to establish a secure context with application layer 218.

It may be that application layer 215 identifies portion 236 in response to distributed application 242A (a first portion of a particular distributed application) indicating a desire to exchange data with distributed application 242B (a second portion of the particular distributed application). Thus, an application designer of distributed applications 242A and 242B (which hereinafter may collectively be referred to as distributed application 242) has increased control over the context information that is identified at a first end message processor (e.g., end message processor 205). Further, portion 236 can be identified by application layer 215 independent of other context information identified at other lower layers 225. The identification of context information can be facilitated by policies that cause contexts with desired properties to be established. In some embodiments, context information is identified from external locations, such as, for example, databases or computer systems that are external to end message processor 205 and external to end message processor 208.

The method 300 includes an act of sending first context information (act 302). Act 302 can include sending the first portion of context information to the second end message processor. For example, as illustrated by Arrow 2 in FIG. 2, end message processor 205 can send electronic message 230 to end message processor 208. End message processor 205 can compose electronic message 230 to include portion 236 as well as other context information for establishing a secure context between application layers 215 and 218. The routing path of electronic message 230 can be configured based on desired functionality.

If desired, electronic message 230 can be routed along a routing path through intermediary message processors 206 and 207. However, the routing path for electronic message 230 is not important. Electronic message 230 can be routed along virtually any routing path that allows communication between end message processor 205 and end message processor 208. This can include routing electronic message 230 along a routing path that includes one or more message processors that are external to network architecture 200.

Based on network conditions a routing path may dynamically change. For example, intermediary message processor 207 may receive electronic message 230 that is to be delivered to end message processor 208. If communication over logical communication link 219 is for some reason unavailable, intermediary message processor 207 can re-route electronic message along an alternate routing path for delivery to end message processor 208. Intermediary message processor 207 may change values in a routing field of electronic message 230 to facilitate re-routing.

End message processor 205 may also compose electronic message 230 to include other non-context information. For example, other modules at end message processor 205 may desire to communicate with other modules at end message processor 208 (or modules of an intermediary message processor in the routing path between end message processors 205 and 208). As such, these other modules at end message processor 205 may identify non-context information to facilitate the desired communication. If appropriate, identified non-context information can be included along with portion 236 and other context information within electronic message 230. This may conserve message processor resources and network bandwidth by reducing the overhead associated with creating and transferring a separate electronic message containing the non-context information. In some embodiments, non-context information can be included along with context information within a data structure.

Figure 4:
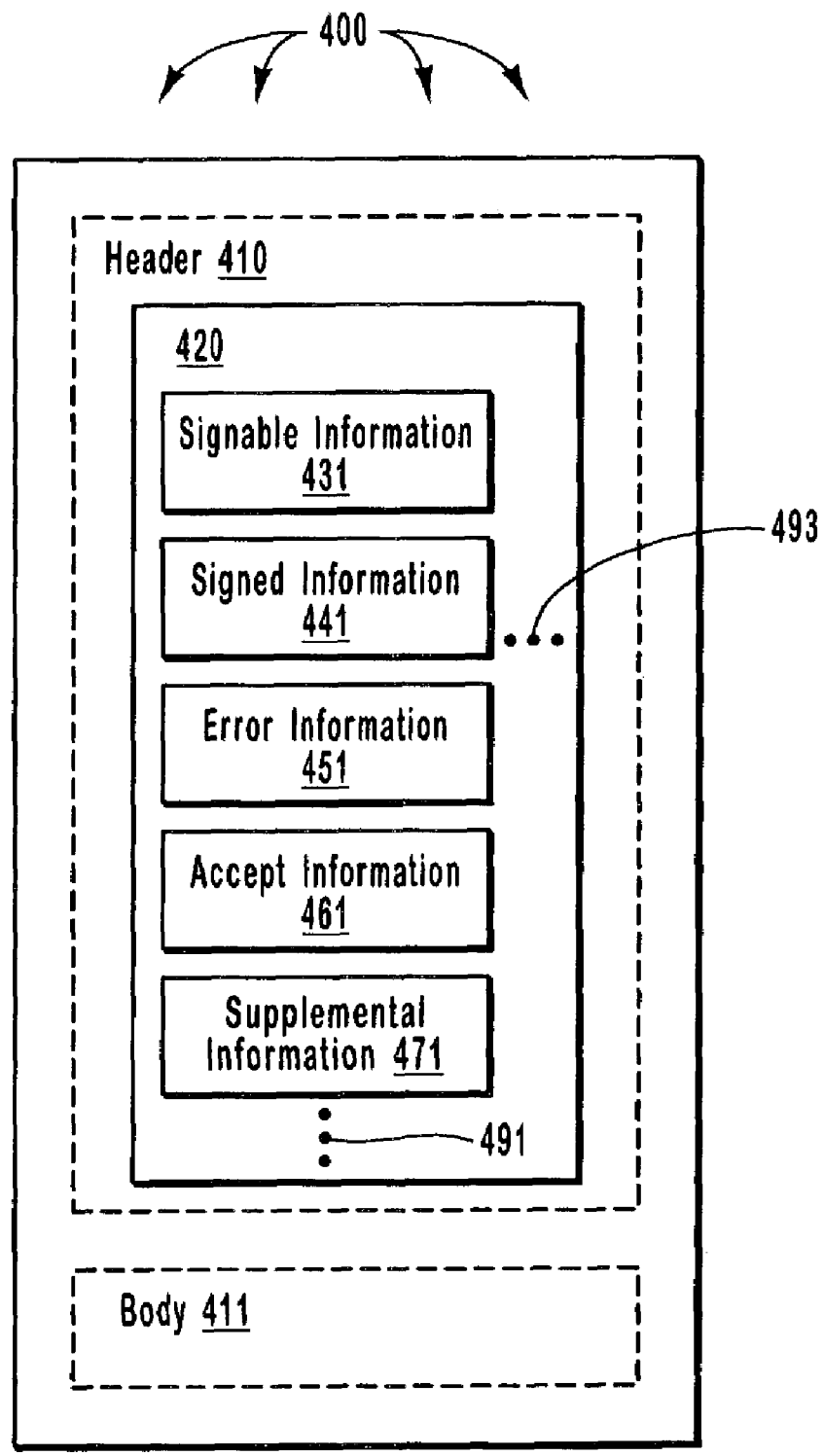
FIG. 4 illustrates an example of an electronic message containing context information.

Depicted in FIG. 4 is electronic message 400. Electronic message 400 is an example of one format of electronic message that can be used when implementing the principles of the present invention. Any of electronic messages 230, 232, and 234 may be of a format similar to electronic message 400. Electronic message 400 includes header 410 and body 411. Generally, header data included in header 410 determines how the body 411 is to be processed. In the example electronic message 400, header 410 includes context marker 420, which further includes the elements signable information 431, signed information 441, error information 451, accept information 461 and supplemental information 471. Ellipsis 493 and vertical ellipsis 495 illustrate that other context information can be included within context marker 420. Although a single context marker (context marker 420) is illustrated within header 410 it should be understood other context markers could also be included.

When non-context information is included along with context information in an electronic message, non-context information can be included within header 410 and/or body 411. In some embodiments, context information, such as, for example, at least a portion of the context information in context marker 420 can be included in body 411. In these embodiments, some context information can be included in header 410 and some context information can be included in body 411. Alternately in these embodiments, all of the context information can be included in body 411.

It should be understood that the present invention is not limited to messaging using any specific transport protocol and format. However, one example protocol that may be used to implement the principles of the present invention is called Simple Object Access Protocol ("SOAP"). Electronic message 230 may be a SOAP message that uses any number of lower level protocols, such as, for example, HyperText Transfer Protocol ("HTTP") or Direct Internet Message Encapsulation ("DIME") as a transport.

In some embodiments, context marker 420 can be a data structure that is included within a SOAP envelope with header 410 being the header field of the SOAP envelope, and with body 411 being the body of the SOAP envelope. The following represents a first example of an XML element that may be included in the header and/or body of a SOAP envelope for representing context information:

```
1.   <SecurityContext>
2.     <ds:Signable>
3.       FIRST SIGNABLE CONTEXT INFORMATION
4.     </ds:Signable>
5.     <SupplementalExchange>
6.       FIRST SUPPLEMENTAL CONTEXT INFORMATION
7.     </SupplementalExchange>
8.   </SecurityContext>
```

The sub-elements within the first example XML element (between <SecurityContext>and </SecurityContext>) can include one more free-form XML documents. Likewise, the sub-elements within the first example XML element can include one more XML documents that are defined in accordance with an XML schema accessible to the message processors depicted in network architecture 200. The first example XML element includes a "Signable" sub-element and a "SupplementalExchange" sub-element. However, inclusion of both of these sub-elements within a SOAP envelope (or any other electronic message) is optional.

These sub-elements are included merely to illustrate one example of some of the elements that can be used to implement the principles of the present invention. Depending on the desired functionality one or both of these sub-elements, can be included in an electronic message. Further, it would be apparent to one skilled in the art, after having reviewed this description, that a wide variety of other sub-elements, in addition to the illustrated sub-elements, can be used to implement the principles of the present invention. For example, sub-elements representing any of the fields of electronic message 400 can be included in an XML element.

The Signable sub-element (lines 2-4) is an example of a sub-element that can be used to store First Signable Context Information. The First Signable Context Information can be context information that is included in electronic message 230 (e.g., portion 236). On the other hand, the First Signable Context Information can also be context information that is not included in electronic message 230. For example, the First Signable Context Information can be context information stored (e.g., in system memory or at a mass storage device) at end message processor 208. A module at end message processor 205 (e.g., distributed application 242A and/or application layer 215) may desire that a module at end message processor 208 (e.g., distributed application 242B and/or application layer 218) sign the First Signable Context Information (included in electronic message 230 and/or stored at some other location). The use of "ds:" within the Signable sub-element can indicate that the Signable sub-element is defined within the "ds" namespace and is thus distinguishable from Signable elements defined in other namespaces.

The SupplementalExchange sub-element (lines 5-7) is an example of a sub-element that can be used to store First Supplemental Context Information. First Supplemental Context Information can include nonces (random numbers) and label strings used for deriving keys, signature rules for indicating what part of the First Signable Context Information is to be signed, as well as other non-signable context information for establishing a secure context between application layer 215 and application layer 218. In some embodiments, the First Signable Context Information may indicate that a portion of the First Supplemental Context Information is to be signed.

The method 300 includes a functional result-oriented step for exchanging information (step 312). Step 312 may include any corresponding acts for accomplishing the result of exchanging information. However, in the illustrated example of FIG. 3, the step 312 includes a corresponding act of receiving first context information (act 306). This can include receiving a first portion of context information that was identified by a first application layer at the first end message processor. For example, as illustrated by Arrow 2 in FIG. 2, end message processor 208 can receive electronic message 230 (which may include portion 236) from end message processor 205. In some embodiments, end message processor 208 establishes a secure context with end message processor 205 based solely on context information included in portion 236.

Electronic message 230 may also identify context information stored at end message processor 208, such as, for example, in context information 248, that is to be included in the first context information. Reception of electronic message 230 can indicate to modules at end message processor 208 that application layer 215 is desirous of establishing a secure context with application layer 218. For example, reception of electronic message 230 may also further indicate that distributed application 242A is desirous of establishing a secure context with distributed application 242B.

Step 312 also includes a corresponding act of identifying second context information (act 307). Act 307 can include a second application layer at the second end message processor identifying that a second portion of context information is to be used along with the first portion of context information to establish a secure context with the first application layer. For example, as illustrated by Arrow 3 in FIG. 2, application layer 218 identifies a portion of context information 239 (hereinafter referred to simply as "portion 239") from context information 248. Application layer 218 can indicate that portion 239 is to be used along with portion 236 to establish a secure context with application layer 215.

It may be that application layer 218 identifies portion 239 in response to distributed application 242B (the second portion of distributed application 242) indicating a desire to exchange data with distributed application 242A (the first portion of the distributed application 242). Thus, an application designer of distributed application 242 has increased control over the context information that is identified at a second end message processor (e.g., end message processor 208). Further, portion 239 can be identified by application layer 218 independent of other context information identified at other lower layers 228.

It may be that end message processor 208 stores the First Signable Context Information (e.g., in context information 248). Thus, if a digital signature created from the First Signable Context Information is subsequently received at message processor 208, message processor 208 may be able to authenticate the signature.

Step 312 also includes a corresponding act of sending second context information and a signature (act 308). Act 308 can include sending the second portion of context information along with a fist digital signature, which the second end message processor created from both the first and second portions of context information, to the first end message processor. For example, as illustrated by Arrow 4 in FIG. 2, end message processor 208 can send electronic message 232 to end message processor 205. End message processor 208 can compose electronic message 232 to include portion 239, a digital signature created from both portion 236 (which was received from end message processor 205) and portion 239 (which was identified at end message processor 208), and other context information for establishing a secure context between application layers 218 and 215.

If desired, message 232 can be routed along a routing path that is essentially the reverse of the routing path through which electronic message 230 was routed. For example, if electronic message 230 was routed through intermediary messages processors 206 and 207 (in that order) for delivery to end message processor 208, then electronic message 232 may be routed through intermediary messages processors 207 and 206 (in that order) for delivery to end message processor 205. However, the routing path for electronic message 232 is not important. Message 232 can be routed along virtually any routing path that allows communication between end message processor 208 and end message processor 205. This can include routing message 230 along a routing path that includes one or more message processors that are external to network architecture 200. Electronic message 232 can be routed along a routing path that differs from the path through which electronic message 230 (or any other electronic message) was routed.

End message processor 208 can generate a signature based on signature rules that indicate what context information in an exchange is to be signed. Signature rules can be implied, such as, for example, when a number of message processors agree to signature rules before context information is exchanged. Alternately, signature rules can be included in an electronic message along with exchanged context information. For example, electronic message 230 can include signature rules indicating what part of portion 236 is to be signed by end message processor 208. In some embodiments, signature rules can indicate that only part (as opposed to all) of a portion of exchanged context information is to be signed.

Similar to end message processor 205's composition of electronic message 230, end message processor 208 may compose electronic message 232 to include other non-context information. As such, modules at end message processor 208 may identify non-context information to facilitate desired communication.

The following represents a second example of an XML element that may be included in the header and/or body of SOAP envelope for representing context information:

```
1.  <SecurityContext>
2.      <ds:Signable>
3.          SECOND SIGNABLE CONTEXT INFORMATION
4.      </ds:Signable>
```

```
-continued
5.    <ds:Signature>
6.        FIRST DIGITAL SIGNATURE INFORMATION
7.    </ds:Signature>
8.    <SupplementalExchange>
9.        SECOND SUPPLEMENTAL CONTEXT INFORMATION
10.   </SupplementalExchange>
11. </SecurityContext>
```

Similar to the first example XML element, the second example XML element can include one more free-form XML documents and/or one more XML documents that are defined in accordance with an XML schema. The second example XML element includes a "Singable" sub-element, a "Signature" sub-element, and a "SupplementalExchange" sub-element. However, inclusion of all of these sub-elements within a SOAP envelope (or any other electronic message) is optional. Depending on the desired functionality one, some, or all of these sub-elements, can be included in an electronic message.

The Signable sub-element (lines 2-4) is an example of a sub-element that can be used to store Second Signable Context Information. The Second Signable Context Information can be context information that is included in message 232 (e.g., portion 239). On the other hand, the Second Signable Context Information can also be context information that is not included in message 232. For example, the Second Signable Context Information can be context information stored (e.g., in system memory or at a mass storage device) at end message processor 205. A module at end message processor 208 (e.g., distributed application 242B and/or application layer 218) may desire that a module at end message processor 205 (e.g., distributed application 242A and/or application layer 215) sign the Second Signable Context Information (included in message 232 and/or stored at some other location).

The signature sub-element (lines 5-7) is an example of a sub-element that can be used to store First Digital Signature Information. The First Digital Signature Information can include a digital signature created from the First Signable Context Information included in the first example XML element (e.g., portion 236) and the Second Signable Context Information (e.g., portion 239). Signable context information stored at an end message processor can also be used when creating a digital signature. For example, one or more modules at end message processor 208 may combine portions 236 and 239 and then generate a message digest from the combined portions. It may also be that one or more modules at end message processor 208 encrypt the generated message digests. Digital signatures (whether they be message digests or encrypted message digests) can be included in the First Digital Signature Information. If a message digest is encrypted with a private key for end message processor 208 or distributed application 242B, end message processor 205 can use the corresponding public key to identify that end message processor 208 or distributed application 242B signed the message digest.

The use of "ds:" within the Signature sub-element can indicate that the Signature element sub-element is defined within the same namespace (i.e., the ds namespace) as the Signable sub-element. However, the namespace in which the Signature sub-element is defined is not important. The Signature sub-element can be defined in any namespace, even namespaces that differ from namespace in which the Signable sub-element is defined.

The SupplementalExchange sub-element (lines 8-10) is an example of a sub-element that can be used to store Second Supplemental Context Information. Second Supplemental Context Information can include supplemental context information that corresponds to the First Supplemental Context Information from the first example XML element. For example, if the First Supplemental Context Information included a nonce and label strings for deriving keys, the Second Supplemental Context Information may include a key derived from a nonce and a label string. Second Supplemental Context Information can also include signature rules for indicating what part of the Second Signable Context Information is to be signed as well as other non-signable context information for establishing a secure context between application layer 218 and application layer 215. In some embodiments, the Second Signable Context Information may indicate that a portion of C the Second Supplemental Context Information is to be signed.

Returning to FIG. 3, the method 300 includes a functional result-oriented step for exchanging signatures (step 311). Step 311 may include any corresponding acts for accomplishing the result of exchanging signatures. However, in the illustrated example of FIG. 3, the step 311 includes a corresponding act of receiving the second context information and signature (act 303). Act 303 can include receiving a second portion of context information, identified by the second application layer at the second message processor, along with a first digital signature that the second end message processor created from both the first and second portion of context information. For example, as illustrated by Arrow 4 in FIG. 2, end message processor 205 can receive electronic message 232 (which can include portion 239 and a digital signature of both portions 236 and 239) from end message processor 208.

Electronic message 232 may also identify that context information stored at end message processor 205, such as, for example, in context information 245, is to be included in the second context information. Reception of electronic message 232 can indicate to modules in end message processor 205 that application layer 218 is desirous of establishing a secure context with application layer 215. Reception of electronic message 232 may also further indicate that distributed application 242B is desirous of establishing a secure context with distributed application 242A.

Step 311 also includes a corresponding act of sending a signature (act 304). Act 304 can include sending a second digital signature, which the first end message processor created from both the first and second portions of context information, to the second end message processor. For example, as illustrated by Arrow 5 in FIG. 2, end message processor 205 can send electronic message 234 to end message processor 208. End message processor can generate a signature based on signature rules previously exchanged with other message processors and/or signature rules included in electronic message 232.

End message processor 205 can compose electronic message 234 to include a digital signature created from both portion 236 (or other context information identified at end message processor 205) and portion 239 (or other context information identified at end message processor 208). Also, similar to end message process 205's composition of electronic message 230, end message processor 205 may compose electronic message 234 to include other non-context information. As such, modules at end message processor 205 may identify additional non-context information to facilitate desired communication.

The following represents a third example of an XML element that may be included in the header and/or body of a SOAP envelope for representing context information:

```
1.  <SecurityContext>
2.      <ds:Signature>
3.          SECOND DIGITAL SIGNATURE INFORMATION
4.      </ds:Signature>
5.      <S:Fault>
6.          FIRST ERROR INFORMATION
7.      <S:/Fault>
8.  </SecurityContext>
```

Similar to the first and second example XML elements, the third example XML element can include one more free-form XML documents and/or one more XML documents that are defined in accordance with an XML schema. The third example XML element includes a "Signature" sub-element and a "Fault" sub-element. However, inclusion of both of these sub-elements within a SOAP envelope (or any other electronic message) is optional. Depending on the desired functionality one or both of these sub-elements, can be included in an electronic message.

The Signature sub-element (lines 2-4) is an example of a sub-element that can be used to store Second Digital Signature Information. The Second Digital Signature Information can include a digital signature created from the First Signable Context Information included in the first example XML element (e.g., portion 236) and the Second Signable Context Information included in the second example XML element (e.g., portion 239). For example, one or more modules at end message processor 205 may combine portions 236 and 239 and generate a message digest from the combined portions. Signable context information stored at an end message processor can also be used when creating a digital signature. It may also be that one or more modules at end message processor 205 encrypt the generated message digests. Digital signatures (whether they be message digests or encrypted message digests) can be included in the Second Digital Signature Information. If a message digest is encrypted with a private key for end message processor 205 or distributed application 242A, end message processor 208 can use the corresponding public key to identify that end message processor 205 or distributed application 242A signed the message digest.

The Fault sub-element (lines 5-7) is an example of a sub-element that can be used to store a First Error Information. The First Error Information can include information indicating an error in the First Signable Context Information and/or Second Signable Context Information. For example, end message processor 205 may compare the digital signature included in the Second Digital Signature Information to the digital signature that was included in the First Digital Signature Information. If the digital signatures do not match this can indicate an error in either the First and/or the Second Signable Context Information (e.g., as the result of a transmission error or tampering). The use of "S:" within the Fault sub-element can indicate that the Fault sub-element is defined within the "S" namespace and is thus distinguishable from Fault sub-elements defined in other namespaces.

When end message processor 205 detects an error in the First Signable Context Information and/or the Second Signable Context Information, end message processor 205 may send an electronic message that includes a Fault sub-element to end message processor 208. When end message processor 205 indicates an error, method 300 may be restarted at act 301. Method 300 may continue to be restarted at act 301 until end message processor 205 accepts the First Signable Context Information and/or the Second Signable Context Information (e.g., when message digests match). Alternately, the establishment of a secure context may fail after end message processor 205 indicates an error.

Parallel to act 304, the method 300 includes an act of the first end message processor establishing a secure context (act 305). Act 305 can include the first application layer at the first end message processor establishing a secure context with the second application layer at the second end message processor. For example in FIG. 2, application layer 215 may establish secure context 246 with application layer 218. A secure context may be established when end message processor 205 accepts the context information that has been received from end message processor 208. End message processor 205 can indicate that it accepts context information by sending an electronic message that includes an XML Accept element to end message processor 208. An XML Accept element may be an XML sub-element that is included within a SecurityContext element in place of an XML Fault sub-element. For example, lines 5-7 of the third example XML element may be replaced with the following XML sub-element:

<S:Accept>
    FIRST ACCEPT INFORMATION
<S:/Accept>

The First Accept Information can indicate that end message processor 205 has accepted a portion of context information, such as, for example, context information from end message processor 208. When end message processor 205 faults some context information and accepts some context information, both a Fault sub-element and an Accept sub-element can be included in an electronic message. The use of "S:" within the Accept sub-element can indicate that the Accept sub-element is defined within same namespace (i.e., the S namespace) as the Fault sub-element. However, the namespace in which the Accept sub-element is defined is not important. The Accept sub-element can be defined in any namespace, even namespaces that differ from namespace in which the Fault sub-element is defined.

End message processor 205 can determine that context information is accepted, for example, by authenticating the content of the First and Second Signable Context Information and/or authenticating that end message processor 205 signed the First and/or Second Signable Context Information. This can occur when a message digest received from end message processor 208 is decrypted with the public key of end message processor 208 or distributed application 242B to reveal a message digest that matches a message digest generated at message processor 205.

In some embodiments, end message processor 205 may repeat one or more of the acts 301-305 based on desired functionality. For example, end message processor 205 can repeat act 301 a plurality of times to identify a plurality of portions of first context information. If other functionality is desired, end message processor 205 can repeat act 302 a plurality of times to send a plurality of portions of first context information to end message processor 208. If yet other functionality is desired, end message processor 205 may repeat act 303 a plurality of times to receive a plurality of portions of context information and signatures from end message processor 208. If yet still other functionality is desired, end message processor 205 can repeat act 304 a plurality of times to send a plurality of signatures to end message processor 208. If yet further other functionality is desired, end message processor 205 can repeat act 305 a plurality of times to establish a plurality of secure contexts with end message processor 208.

The method 300 includes an act of receiving a signature (act 309). Act 309 can include receiving a second digital signature that the first end message processor created from both the fist and second portions of context information. For example, as illustrated by Arrow 5 in FIG. 2, end message processor 208 can receive electronic message 234, which can include the second digital signature, from end message processor 205.

When end message processor 208 detects an error in the First Signable Context Information and/or the Second Signable Context, end message processor 208 may send an electronic message that includes a Fault sub-element to end message processor 205. When end message processor 208 indicates an error, method 300 may be restarted at act 301. Method 300 may continue to be restarted at act 301 until end message processor 208 accepts the First Signable Context Information and/or the Second Signable Context Information (e.g., when message digests match). Alternately, the establishment of a secure context may fail after end message processor 208 indicates an error.

Method 300 includes an act of the second end message processor establishing a secure context (act 310). Act 310 can include the second application layer at the second end message processor establishing a secure context with the first application layer at the first tend message processor. For example in FIG. 2, application layer 218 may establish secure context 246 with application layer 215. A secure context may be established when end message processor 208 accepts the context information that has been received from end message processor 205. End message processor 208 can indicate that it accepts context information by including an XML accept element in an electronic message that is sent to end message processor 205. The XML accept element can be an XML sub-element that is included within a SecurityContext element. Such an XML sub-element may include a Second Accept Information.

End message processor 208 can determine that context information is accepted, for example, by authenticating the content of the First and Second Signable Context Information and/or authenticating that end message processor 208 signed the First and/or Second Signable Context Information. This can occur when a message digest received from end message processor 205 is decrypted with the public key of end message processor 205 or distributed application 242A to reveal a message digest that matches a message digest generated at message processor 208.

In some embodiments, end message processor 208 may repeat one or more of the acts 306-310 based on desired functionality. For example, end message processor 208 can repeat act 306 a plurality of times to receive a plurality of portions of context information from end message processor 205. If other functionality is desired, end message processor 208 can repeat act 307 a plurality of times to identify a plurality of portions of second context information. If yet other functionality is desired, end message processor 208 can repeat act 308 a plurality of times to send a plurality of portions of context information and/or signatures to end message processor 205. It yet still other functionality is desired, end message processor 208 can repeat act 309 a plurality of times to receive a plurality of signatures. If yet further other functionality is desired, end message processor 208 can repeat act 310 to establish a plurality of secure contexts with end message processor 205.

If both end message processor 205 and end message processor 208 authenticate exchanged context information, a two-way secure context can be established. If one end message processor authenticates exchanged context information (or is allowed to be anonymous), a one-way secure context can be established. For example, the context from end message processor 205 to end message processor 208 may be a secure context but not vice-versa. That is, end message processor 208 may have authenticated context information that is received from end message processor 205. On the other hand, end message processor 205 may not have authenticated context information received from end message processor 208. Thus, end message processor 205 may not trust that other information indicated as being sent from end message processor 208 was sent from end message processor 208. This lack of trust may result, for example, when end message processor 208 digitally signs context information with a shared secret or a public key (and not a private key). Thus, it can be verified that context information was not altered but it cannot necessarily be verified that end message processor 208 digitally signed the context information.

Figure 5:
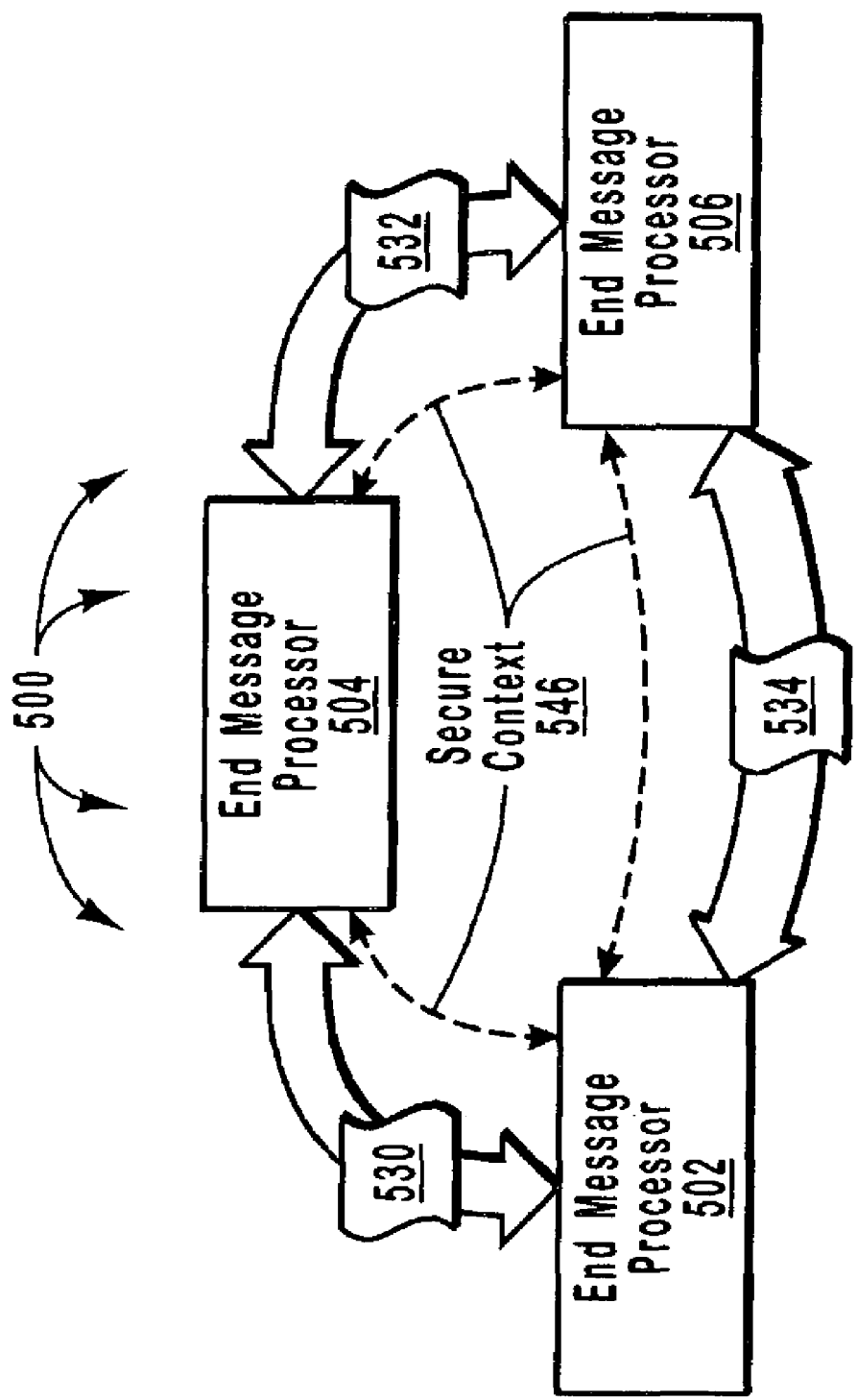
FIG. 5 illustrates an example of network architecture that can facilitate establishing a secure context between three or more communication end-points.
Figure 6:
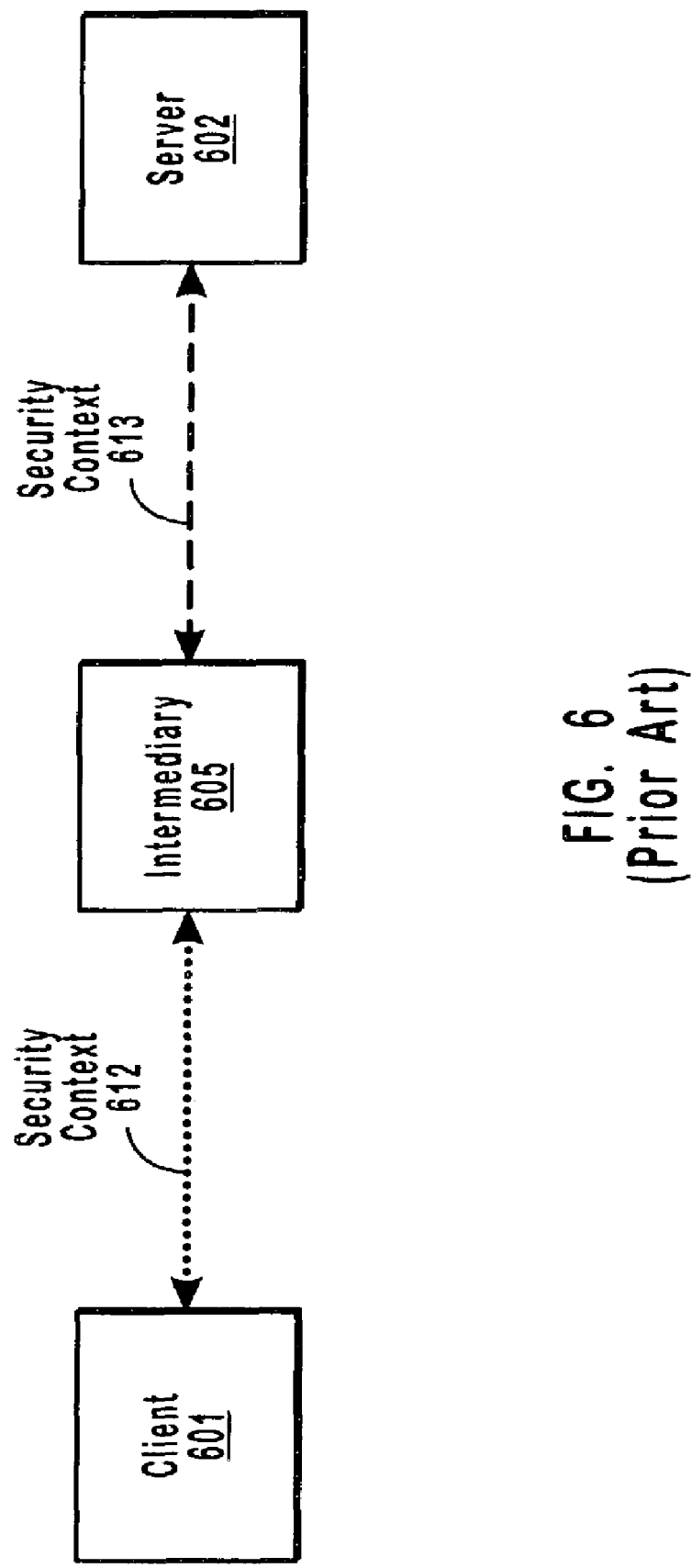
FIG. 6 is a prior art system illustrating a client, an intermediary, and a server.

In some embodiments, context information is exchanged between application layers at three or more communication end-points (e.g., three or more message processors) so as to establish a secure context among the three or more communication end-points. FIG. 5 illustrates an example of network architecture 500 that can facilitate establishing a secure context between three or more communication end-points. Electronic messages 530, 532, and 534 illustrate generally that context information and signatures are sent and received among end message processors 502, 504, and 506. However, the principles of the present invention can be practiced in any environment where one or more electronic messages are exchanged. When context information is accepted by one of the end message processors 502, 504, or 506 a secure context can be established at that end message processor.

For example, a first portion of a distributed application at end message processor 502 may accept context information from both a second portion of the distributed application at end message processor 504 and third portion of the distributed application at end message processor 506. It may also be that end message processor 502 sends a single electronic message including context information to end message processors 504 and 506. If the end message processors 502, 504 and 506 accept appropriate context information, secure context 546 can be established between the end message processors 502, 504, and 506.

It should be understood that although network architecture 500 illustrates three communications end-points (end message processors 502, 504, and 506), the principles of the present are scalable to any number of communication end-points. For example, end message processors 502, 504, and/or 506 may exchange context information with other end message processors (not shown) that are external to network architecture 500. If one or more of these external end message processors accepts context information, secure context 546 can be scaled to include the one or more external end message processors.

By exchanging context information at the application layer, application designers are given more freedom to control the exchange of context information and thus also have more freedom to control the properties of resulting secure contexts. Further, application designers are not constrained to establishing a secure context based on context information that is exchanged at other layers of a communication stack. Further, since context information is exchanged at the application layer (and is thus abstracted from lower layers below the application layer in a communication stack) end-to-end secure contexts can be more easily established.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network architecture comprising a plurality of application layers including at least a first application layer, a second application layer and a third application layer, each application layer capable of initiating electronic messages and routing the electronic messages along a plurality of routing paths to any of the other application layers, each application layer corresponding to a separate computer system, wherein each routing path between the first application layer and the other application layer includes one or more intermediary message processors, for each routing path, lower layer security contexts existing on a point to point basis to and from intermediary message processors along the routing path, the lower layer security contexts based on exchanged lower layer configuration settings of the intermediary message processor such that a plurality of different lower layer security contexts exist along the routing paths between the first application and the other application layers, a method for a third application layer, from among the plurality of application layers, to negotiate an application layer secure context between at least the first application layer, the second application layer and the third application layer, the method comprising:

an act of the third application layer receiving at least a first portion of context information that was identified by the first application layer and a second portion of context information that was identified by the second application layer;

an act of the third application layer identifying that at least a third portion of context information is to be used along with the first portion of context information and the second portion of context information to establish an application layer secure context between the first application layer, the second application layer and the third application layer, the application layer secure context between a first end message processor, a second end message processor and a third end message processor spanning over the plurality of routing paths, the application layer secure context for securing communication between the application layers independent of and abstracted from the plurality of different lower layer security contexts established on a point to point basis to and from the intermediary message processors along the plurality of routing paths;

an act of the third application layer accessing the first portion of context information, the second portion of context information, a first digital signature and a second digital signature, the first digital signature having been created based on the first portion of context information and the second digital signature having been created based on the second portion of context information; and an act of the third application layer establishing the application layer secure context between at least the first application layer, the second application layer and the third application layer based on the first, second and third portions of context information and the first and second created digital signatures such that application data transferred between the first, second and third application layers is uniformly transferred in accordance with the application layer secure context even though the application data travels to and from intermediary message processors in the plurality of routing paths having different lower layer security contexts.

2. The method as recited in claim 1, wherein the act of receiving at least a first portion of context information that was identified by the first application layer and a second portion of context information that was identified by the second application layer comprises an act of receiving an electronic message that includes the first portion of context information and receiving an electronic message that includes the second portion of context information.

3. The method as recited in claim 1, wherein the act of receiving at least a first portion of context information that was identified by the first application layer and a second portion of context information that was identified by the second application layer comprises an act of receiving an electronic message that includes an indication of how to access the first portion of context information at the second end message processor and how to access the second portion of context information at the third end message processor.

4. The method as recited in claim 1, wherein the act of the third application layer identifying that at least a third portion of context information is to be used along with the first portion of context information and the second portion of context information to establish an application layer secure context comprises an act of identifying a second portion of context information stored at the first end message processor.

5. The method as recited in claim 1, wherein the act of the third application layer identifying that at least a third portion of context information is to be used along with the first portion of context information and the second portion of context information to establish an application layer secure context comprises an act of identifying a second portion of context information stored at the second end message processor.

6. The method as recited in claim 1, further comprising an act of an act of sending an indication of how to access at least a first and a second portion of context information and a first and a second digital signature.

7. The method as recited in claim 1, wherein the act of establishing a secure context with the first end message processors and the plurality of other end message processors comprises an act of accepting context information.

8. The method as recited in claim 6, wherein the act of sending an indication of how to access at least a first and a second portion of context information and a first and a second digital signature comprises an act of sending an electronic message.

9. The method as recited in claim 8, wherein the act of sending an electronic message comprises an act of sending a SOAP envelope.

10. The method as recited in claim 1, wherein the act of the third application layer identifying that at least a third portion of context information is to be used along with the first portion of context information and the second portion of context information to establish an application layer secure context between the first application layer, the second application layer and the third application layer comprises an act of the third application layer identifying context information that is to be signed by the first application layer and by the second application layer.

11. The method as recited in claim 1, wherein the act of the third application layer receiving at least a first portion of context information that was identified by the first application layer and a second portion of context information that was identified by the second application layer comprises an act of receiving an XML element structured to indicate that a secure context is to be established.

12. The method as recited in claim 11, wherein the act of receiving an XML element structured to indicate that a secure context is to be established comprises an act of receiving an XML element that was inserted into the header of an electronic message.

13. A computer program product for use in a network architecture comprising a plurality of application layers including at least a first application layer, a second application layer and a third application layer, each application layer capable of initiating electronic messages and routing the electronic messages along a plurality of routing paths to any of the other application layers, each application layer corresponding to a separate computer system, wherein each routing path between the first application layer and the other application layer includes one or more intermediary message processors, for each routing path, lower layer security contexts existing on a point to point basis to and from intermediary message processors along the routing path, the lower layer security contexts based on exchanged lower layer configuration settings of the intermediary message processor such that a plurality of different lower layer security contexts exist along the routing paths between the first application and the other application layers, the computer program product for a third application layer, from among the plurality of application layers, to negotiate an application layer secure context between at least the first application layer, the second application layer and the third application layer, the computer program product comprising one or more physical computer-readable medium having stored thereon computer-executable instructions that, when executed at a processor, cause the first message processor to perform the following:

receive at least a first portion of context information that was identified by the first application layer and a second portion of context information that was identified by the second application layer;

identify that at least a third portion of context information is to be used along with the first portion of context information and the second portion of context information to establish an application layer secure context between the first application layer, the second application layer and the third application layer, the application layer secure context between a first end message processor, a second end message processor and a third end message processor spanning over the plurality of routing paths, the application layer secure context for securing communication between the application layers independent of and abstracted from the plurality of different lower layer security contexts established on a point to point basis to and from the intermediary message processors along the plurality of routing paths;

access the first portion of context information, the second portion of context information, a first digital signature and a second digital signature, the first digital signature having been created based on the first portion of context information and the second digital signature having been created based on the second portion of context information; and establish the application layer secure context between at least the first application layer, the second application layer and the third application layer based on the first, second and third portions of context information and the first and second created digital signatures such that application data transferred between the first, second and third application layers is uniformly transferred in accordance with the application layer secure context even though the application data travels to and from intermediary message processors in the plurality of routing paths having different lower layer security contexts.

14. The computer program product as recited in claim 13, wherein receiving at least a first portion of context information that was identified by the first application layer and a second portion of context information that was identified by the second application layer comprises receiving an electronic message that includes the first portion of context information and receiving an electronic message that includes the second portion of context information.

15. The computer program product as recited in claim 13, wherein identifying that at least a third portion of context information is to be used along with the first portion of context information and the second portion of context information to establish an application layer secure context comprises identifying a second portion of context information stored at the first end message processor.

16. The computer program product as recited in claim 13, wherein identifying that at least a third portion of context information is to be used along with the first portion of context information and the second portion of context information to establish an application layer secure context comprises identifying a second portion of context information stored at the second end message processor.

17. The computer program product as recited in claim 13, further comprising sending an indication of how to access at least a first and a second portion of context information and a first and a second digital signature.

18. The computer program product as recited in claim 17, wherein sending an indication of how to access at least a first and a second portion of context information and a first and a second digital signature comprises an act of sending an electronic message.

19. The computer program product as recited in claim 18, wherein sending an electronic message comprises an act of sending a SOAP envelope.

20. In a network architecture comprising a plurality of application layers including at least a first application layer, a second application layer and a third application layer, each application layer capable of initiating electronic messages and routing the electronic messages along a plurality of routing paths to any of the other application layers, each application layer corresponding to a separate computer system, wherein each routing path between the first application layer and the other application layer includes one or more intermediary message processors, for each routing path, lower layer security contexts existing on a point to point basis to and from intermediary message processors along the routing path, the lower layer security contexts based on exchanged lower layer configuration settings of the intermediary message processor such that a plurality of different lower layer security contexts exist along the routing paths between the first application and the other application layers, a system for a third application layer, from among the plurality of application layers, to negotiate an application layer secure context between at least the first application layer, the second application layer and the third application layer, the system comprising:

- a receiving module of the third application layer configured to receive at least a first portion of context information that was identified by the first application layer and a second portion of context information that was identified by the second application layer;
- an identifying module of the third application layer configured to identify that at least a third portion of context information is to be used along with the first portion of context information and the second portion of context information to establish an application layer secure context between the first application layer, the second application layer and the third application layer, the application layer secure context between a first end message processor, a second end message processor and a third end message processor spanning over the plurality of routing paths, the application layer secure context for securing communication between the application layers independent of and abstracted from the plurality of different lower layer security contexts established on a point to point basis to and from the intermediary message processors along the plurality of routing paths;
- a context information accessing module configured to access the first portion of context information, the second portion of context information, a first digital signature and a second digital signature, the first digital signature having been created based on the first portion of context information and the second digital signature having been created based on the second portion of context information; and
- an application layer secure context establishing layer configured to establish the application layer secure context between at least the first application layer, the second application layer and the third application layer based on the first, second and third portions of context information and the first and second created digital signatures such that application data transferred between the first, second and third application layers is uniformly transferred in accordance with the application layer secure context even though the application data travels to and from intermediary message processors in the plurality of routing paths having different lower layer security contexts.

* * * * *